(12) United States Patent
Gonzalez Martin et al.

(10) Patent No.: US 12,186,989 B2
(45) Date of Patent: Jan. 7, 2025

(54) DETERMINING BUILD PARAMETERS IN ADDITIVE MANUFACTURING

(71) Applicant: Hewlett-Packard Development Company, L.P., Spring, TX (US)

(72) Inventors: Sergio Gonzalez Martin, Sant Cugat del Valles (ES); Manuel Freire Garcia, Sant Cugat del Valles (ES); Ismael Fernandez Aymerich, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 267 days.

(21) Appl. No.: 17/642,252

(22) PCT Filed: Oct. 21, 2019

(86) PCT No.: PCT/US2019/057231
§ 371 (c)(1),
(2) Date: Mar. 11, 2022

(87) PCT Pub. No.: WO2021/080557
PCT Pub. Date: Apr. 29, 2021

(65) Prior Publication Data
US 2022/0314548 A1 Oct. 6, 2022

(51) Int. Cl.
| | | |
|---|---|---|
| *B33Y 50/00* | (2015.01) |
| *B29C 64/386* | (2017.01) |
| *B33Y 50/02* | (2015.01) |
| *G05B 19/4099* | (2006.01) |
| *B29C 64/165* | (2017.01) |

(52) U.S. Cl.
CPC ............ *B29C 64/386* (2017.08); *B33Y 50/00* (2014.12); *G05B 19/4099* (2013.01); *B29C 64/165* (2017.08); *G05B 2219/49023* (2013.01)

(58) Field of Classification Search
CPC ........ B33Y 50/00; B33Y 50/02; B29C 64/386
See application file for complete search history.

(56) References Cited

U.S. PATENT DOCUMENTS

| | | |
|---|---|---|
| 2001/0045678 A1 | 11/2001 | Kubo et al. |
| 2016/0107392 A1 | 4/2016 | Lubin et al. |
| 2018/0001567 A1 | 1/2018 | Juan et al. |
| 2018/0009134 A1 | 1/2018 | Berben et al. |
| 2018/0215100 A1 | 8/2018 | Nguyen et al. |

(Continued)

FOREIGN PATENT DOCUMENTS

| | | |
|---|---|---|
| CN | 108602279 A | 9/2018 |
| CN | 109070452 A | 12/2018 |

(Continued)

*Primary Examiner* — Mark A Connolly
(74) *Attorney, Agent, or Firm* — Michael Dryja

(57) ABSTRACT

A computer-implemented method is disclosed. The computer-implemented method comprises receiving data indicative of a post-manufacture treatment to be applied to a three-dimensional object following completion of a manufacturing process to generate the three-dimensional object; and determining, based on the received data indicative of the post-manufacture treatment, build parameters to be applied in respect of the manufacturing process. A manufacturing apparatus and a machine-readable medium are also disclosed.

14 Claims, 4 Drawing Sheets

Receive data indicative of a post-manufacture treatment to be applied to a three-dimensional object following completion of a manufacturing process to generate the three-dimensional object — 102

Determine, based on the received data indicative of the post-manufacture treatment, build parameters to be applied in respect of the manufacturing process — 104

(56) References Cited

U.S. PATENT DOCUMENTS

| | | |
|---|---|---|
| 2019/0091804 A1 | 3/2019 | Karlen et al. |
| 2019/0176390 A1 | 6/2019 | White et al. |
| 2019/0202132 A1 | 7/2019 | De Pena et al. |
| 2019/0240924 A1 | 8/2019 | Hendrik |
| 2019/0291349 A1 | 9/2019 | Fornos et al. |
| 2021/0064002 A1* | 3/2021 | Leeson ............. A61C 13/0004 |
| 2021/0178696 A1 | 6/2021 | De et al. |

FOREIGN PATENT DOCUMENTS

| | | | | |
|---|---|---|---|---|
| CN | 109070463 A | | 12/2018 | |
| CN | 109664504 A | * | 4/2019 | ............. B22F 10/20 |
| WO | WO-2016196382 A1 | | 12/2016 | |
| WO | 2019/160526 A2 | | 8/2019 | |

* cited by examiner

DETERMINING BUILD PARAMETERS IN ADDITIVE MANUFACTURING

BACKGROUND

Additive manufacturing may be used to generate three-dimensional objects on a layer-by-layer basis, by processing successive layers of build material. Print agent, such as coalescing agent, may be selectively applied to portions of layers of build material to cause those portions to coalesce and/or solidify. Other manufacturing techniques may also be used to generate three-dimensional objects.

Following the generation of a three-dimensional object, the object may undergo a finishing treatment, or post-production treatment, appropriate for the intended use of the object.

BRIEF DESCRIPTION OF DRAWINGS

Examples will now be described, by way of non-limiting example, with reference to the accompanying drawings, in which.

DETAILED DESCRIPTION

Figure 1:
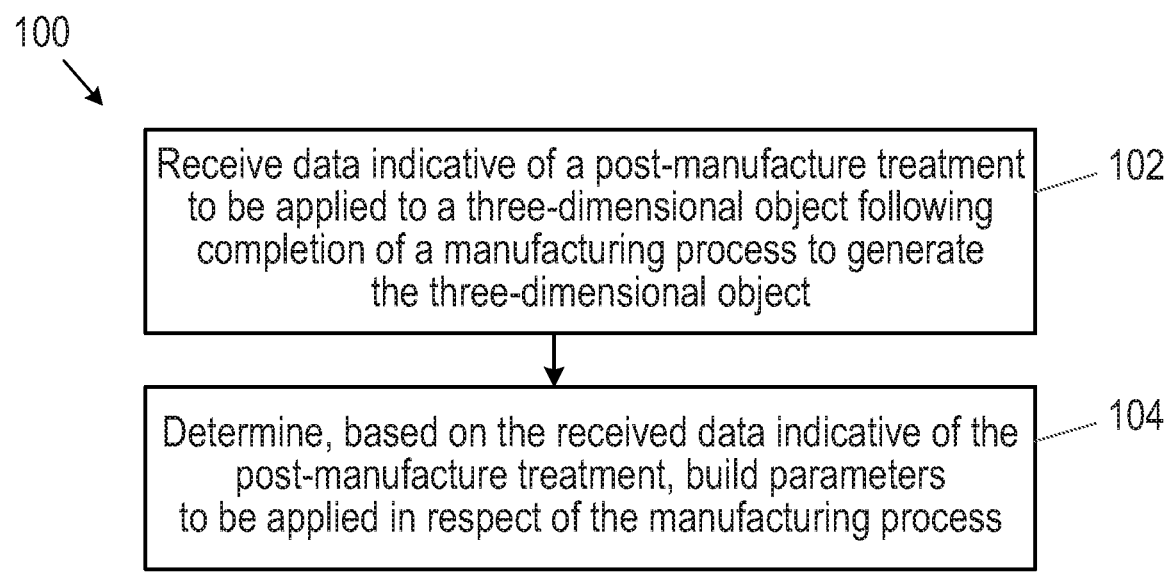
FIG. 1 is a flowchart of an example of a method according to the present disclosure.

Various post-production operations or treatments may be performed in respect of three-dimensional objects that have been generated in manufacturing processes. For example, an object may be generated using an additive manufacturing process, using build material, such as plastics or metal, and it may be intended to color (e.g. paint or dye) the object following its generation. Objects may also be generated using other types of manufacturing. During the object generation process (sometimes referred to as a build process), different parameters may be applied according to the intended resulting object. In additive manufacturing, for example, different types of agents (sometimes referred to as printing agents) may be applied to the build material. For example, coalescing agent or fusing agent may be applied to cause portions of build material to coalesce and solidify upon the application of heat; detailing agent may be applied to cause edge regions of the object being built to have certain characteristics; and coloring agent may be used to cause the object to appear a particular color. Different printing agents may have different effects on the object, particularly on regions near to the surface of the object. In other manufacturing types, other parameters may be applied or set according to the intended outcome of the manufacturing process. It has been recognized that some post-production operations or treatments may be more effective if, during the object manufacturing phase, parameters are applied differently. For example, in additive manufacturing, printing agents may be applied in particular proportions, depending on post-production treatment to be applied.

In other types of manufacturing, post-production treatments may be more effective when parameters applied in respect of the build process are selected or set according to the post-production treatments to be performed. For example, build parameters other than parameters concerning printing agents may be varied to achieve an object that is more appropriate for the intended post-generation treatment. Thus, while some examples disclosed herein are described with reference to additive manufacturing, the techniques, apparatuses and machine-readable medium disclosed herein are applicable to other manufacturing techniques, such as selective laser sintering (SLS) and fused deposition modelling (FDM). As used herein, the term "build parameter" is intended to refer to a parameter to be set or applied as part of the manufacturing process.

Accordingly, the present disclosure provides a mechanism by which build parameters to be used in an object manufacturing process (e.g. an additive manufacturing process to generate a three-dimensional object) may be determined based on the intended post-manufacture treatment or operation that is to be performed in respect of the object. With knowledge of the post-production operation or treatment to be applied to the object once it has been built, it is possible to determine the build parameters to be used by the manufacturing apparatus to build the object, such that the object is manufactured in a manner that is appropriate for the post-production operation, such that the performance of the post-production operation in respect of the object is effective and has the intended effect.

As discussed briefly above, additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber. According to one example, a suitable build material may be PA12 build material commercially known as V1R10A "HP PA12" available from HP Inc.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern.

According to one example, a suitable fusing agent may be an ink-type formulation comprising carbon black, such as, for example, the fusing agent formulation commercially known as V1Q60A "HP fusing agent" available from HP Inc. In one example such a fusing agent may additionally comprise an infra-red light absorber. In one example such a fusing agent may additionally comprise a near infra-red light absorber. In one example such a fusing agent may additionally comprise a visible light absorber. In one example such a fusing agent may additionally comprise a UV light absorber. Examples of print agents comprising visible light enhancers are dye based colored ink and pigment based colored ink, such as inks commercially known as CE039A and CE042A available from HP Inc.

In other examples, coalescence may be achieved in some other manner.

In addition to a fusing agent, in some examples, a print agent may comprise a coalescence modifying agent (referred to as modifying or detailing agents herein after), which acts to modify the effects of a fusing agent for example by reducing or increasing coalescence or to assist in producing a particular finish or appearance to an object, and such agents may therefore be termed detailing agents. A detailing agent (also termed a "coalescence modifier agent") may, in some examples, have a cooling effect. In some examples, the detailing agent may be used near edge surfaces of an object being printed. According to one example, a suitable detailing agent may be a formulation commercially known as V1Q61A "HP detailing agent" available from HP Inc. A coloring agent, for example comprising a dye or colorant, may in some examples be used as a fusing agent or a modifying agent, and/or as a print agent to provide a particular color for the object.

Manufacturing systems (e.g. additive manufacturing systems, selective laser sintering systems and fused deposition modelling systems) may generate objects based on structural design data. This may involve a designer generating a three-dimensional model of an object to be generated, for example using a computer aided design (CAD) application. The model may define the solid portions of the object. In an additive manufacturing system, to generate a three-dimensional object from the model using an additive manufacturing apparatus, the model data can be processed to generate slices of parallel planes of the model. Each slice may define a portion of a respective layer of build material that is to be solidified or caused to coalesce by the additive manufacturing system.

An example additive manufacturing apparatus may include a print bed, or build platform, onto which a layer of build material may be formed. The additive manufacturing apparatus may also include a build material distributor to distribute or form build material on the print bed. In some examples, the additive manufacturing apparatus may include at least one source of radiation to direct radiation towards the print bed. The source of radiation may comprise at least one heat lamp, such as an infrared lamp, which may be positioned above the print bed such that radiation is directed downwards towards the print bed. The source of radiation may, in some examples, include at least one pre-heating lamp for pre-heating the build material and/or at least one fusing lamp for applying heat to fuse portions of the build material. The additive manufacturing apparatus may also include an agent distributor to distribute agent, such as fusing agent and/or detailing agent, onto the layer of build material formed on the print bed. The agent distributor may include at least one set of nozzles through which the print agent may be distributed onto the build material, each set of nozzles having at least one individual nozzle. The nozzles and/or the sets of nozzles may form part of a print head which, in some examples, may be a thermal print head or a piezo print head. The agent distributor may be movable relative to the print bed such that print agent may be selectively deposited, for example drop-by-drop, onto a portion of the layer of build material in a pattern derived from data representing a slice of the three-dimensional object to be built.

Examples of the present disclosure are now described with reference to the drawings. FIG. 1 is a flowchart of an example of a method 100. The method 100 may be performed using processing elements, such as a processor of a computing device and, as such, the method may be considered to be a computer-implemented method. The method may, in some examples, be performed by a computing device, for example using a computer-aided design (CAD) application or a pre-processing process, in which the build process may be designed. In other examples, the method may be performed using a processing apparatus of a print apparatus, or manufacturing apparatus. In some examples, different blocks of the method 100 may be performed by different entities (e.g. by different processing elements). The method 100 comprises, at block 102, receiving data indicative of a post-manufacture treatment to be applied to a three-dimensional object following completion of a manufacturing process to generate the three-dimensional object. The data indicative of the post-manufacture treatment may, in some examples, be received from a user via a user interface. For example, a user may enter the data using a user interface such as a keyboard. In one example, a graphical user interface may provide an opportunity for a user to input details of a post-manufacture treatment to be applied to an object, or multiple objects, to be built during a manufacturing process. In some examples, it may be intended to perform multiple post-manufacture treatments in respect of a single object or part of an object. Similarly, it may be intended to apply different post-manufacture treatments in respect of different objects or parts of objects to be built during the same manufacturing process (e.g. within the same build chamber). Thus, data may be provided (and received at block 102) in respect of multiple objects or parts of objects.

In some examples, the data indicative of the post-manufacture treatment may not be received from a user. Rather, the data may be retrieved from a database or lookup table stored in a storage medium. For example, a particular post-manufacture treatment may be associated with a particular object to be built, and this association may be stored in a database or lookup table. Therefore, when an indication of an object to be built is provided (or received), the method 100 may receive (at block 102) the data indicative of the post-manufacture treatment associated with the object to be built, from the database or lookup table.

At block 104, the method 100 comprises determining, based on the received data indicative of the post-manufacture treatment, build parameters to be applied in respect of the manufacturing process. In some examples, the build parameters may be parameters to be applied during the manufacturing process. In other examples, the build parameters may be parameters to be applied in advance of the manufacturing process, for example during a design stage, during which the manufacturing process is designed or planned. In some examples, a particular built parameter or build parameters may be stored in association with a particular post-manufacture treatment, for example in a database or lookup table. Thus, upon receiving an indication of a particular post-manufacture treatment to be applied (at block 102), method 100 may determine the build parameters (at block 104) by retrieving, from the database or lookup table, an indication of the build parameters associated with the particular post-manufacture treatment. In other examples, the build parameters may be determined (at block 104) by performing a calculation, by using an algorithm or by using a set of rules defined according to the post-manufacture treatment to be performed. Build parameters may, in some examples, be based on (e.g. change depending on) the material to be used in the manufacture process.

In some examples, control data may be used to control a manufacturing apparatus to build the object or objects. The control data may comprise the structural design data discussed briefly above, which may define the nature (e.g. the structure) of the object(s) to be built. In an additive manufacturing apparatus, the control data may, for example, include data defining the type of printing agent, the amount of printing agent, and the position at which printing agent is to be applied (e.g. deposited) for each layer of build material processed during an additive manufacturing process, based on the post-manufacture treatment indicated by the received data. In some examples, the control data defining build parameters for manufacturing the object(s) may be provided and, based on the received data indicative of a post-manufacture treatment, the control data (and the build parameters thereof) may be modified accordingly, to better suit the post-manufacture treatment to be performed. In other examples, the control data may be determined based on the determined build parameters. Both scenarios are discussed below with reference to FIG. 2.

Figure 2:
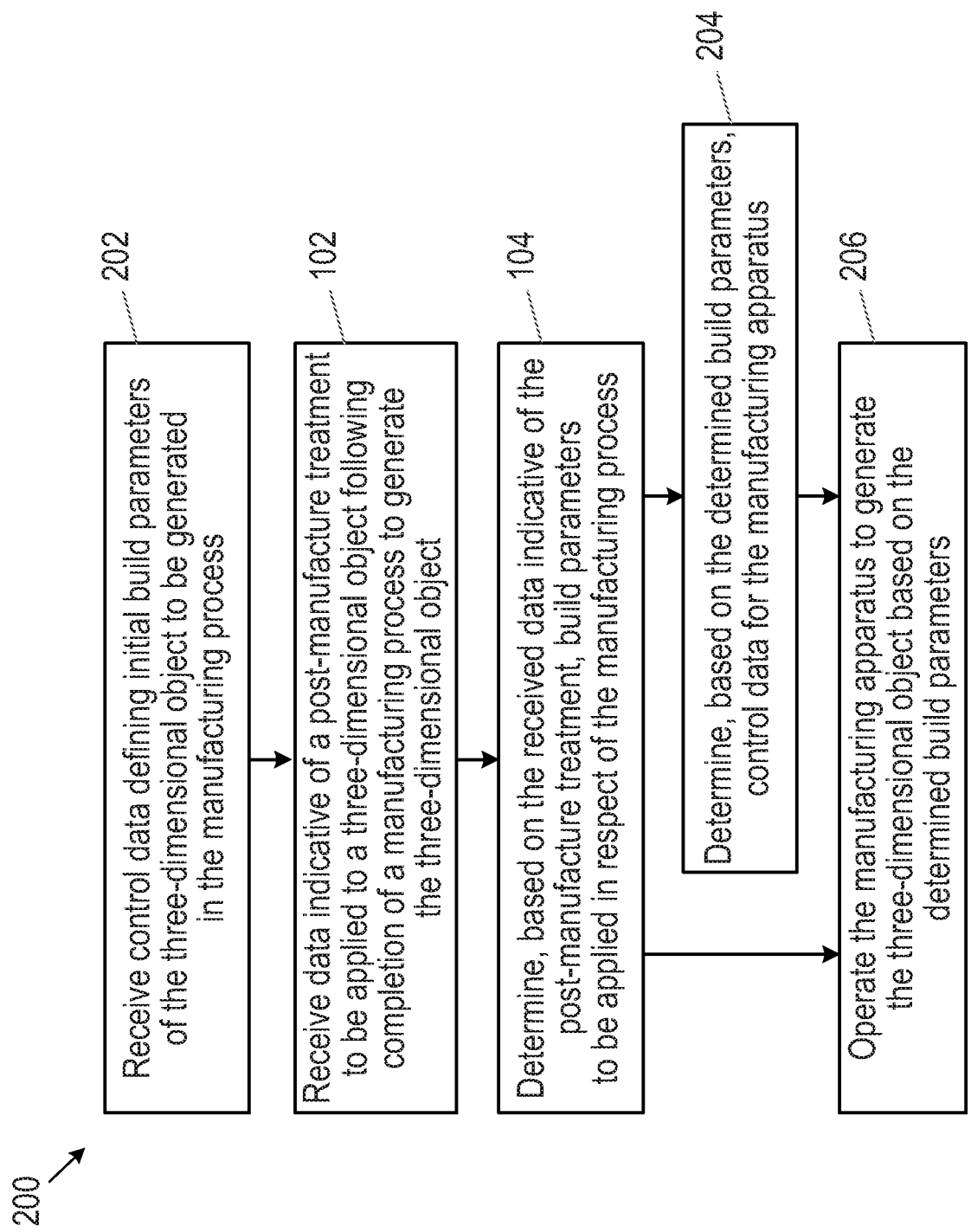
FIG. 2 is a flowchart of a further example of a method according to the present disclosure.

FIG. 2 is a flowchart of a further example of a method 200. The method 200 may also be considered to be a computer-implemented method, and may include a block or blocks of the method 100 discussed above.

At block 202, the method 200 may comprise, prior to the determining of block 104, receiving control data defining initial build parameters of the three-dimensional object to be generated in the manufacturing process. The initial build parameters may, for example, be received in the form of a computer-readable file, such as a 3D manufacturing format (3MF) file. In other examples, build parameters may be received in another format. In some examples, a single file may include control data for multiple objects to be built while, in other examples, each file may include control data for a single object, and multiple files, each including control data for a different object, may be received relating to all of the objects to be manufactured during a manufacturing process.

The control data received at block 202 may be sufficient for manufacturing the object or objects to which the control data relates. However, the initial build parameters defined within the control data may not take into account any intended post-manufacture treatment or operation that is to be performed in respect of any of the objects. Thus, in this example, determining the build parameters (at block 104) may comprise modifying the initial build parameters of the received control data. In other words, the initial build parameters may be modified or adjusted in view of the intended post-manufacture operation to be performed, so that the post-manufacture operation can be performed effectively and such that each object is manufactured to the highest possible quality.

In FIG. 2, the receiving block 202 is shown positioned prior to the receiving block 102. However, in other examples, the control data may be received after the data indicative of a post-manufacture treatment and, therefore, the order of blocks 102 and 202 may be reversed.

As noted above, the method 200 may not modify existing control data in all cases. At block 204, method 200 may, in some examples, comprise determining, based on the determined build parameters, control data for the manufacturing apparatus. Thus, rather than receiving build parameters and modifying them based on the intended post-manufacture treatment, in this example, control data to be used to control the manufacturing apparatus may be determined (e.g. generated) based on the build parameters determined at block 104.

At block 206, the method 200 may further comprise operating the manufacturing apparatus to generate the three-dimensional object based on the determined build parameters. For example, a processor performing the method 100, 200 may control components of the manufacturing apparatus to manufacture the three-dimensional object according to the build parameters. In examples in which initial build parameters are received and modified, the control data defining the initial build parameters may be used to control the manufacturing apparatus to perform the manufacturing process. In such examples, the method 200 may proceed directly from block 104 to block 206. In other examples, where the control data is determined based on the determined build parameters at block 204, then the method 200 may proceed from block 104 to block 206 via block 204.

The manufacturing process may, in some examples, comprises processing successive layers of build material to generate the three-dimensional object. For example, the manufacturing process may comprise an additive manufacturing process. In such examples, determining the build parameters at block 104 may comprise determining parameters to be applied in respect of each layer of build material to be processed based on the indicated post-manufacture treatment (e.g. based on the treatment indicated by the data received at block 102. The positions and amounts of printing agent to be deposited on a layer of build material (e.g. to cause solidification) may be defined separately for each layer of build material. Therefore, when a layer of build material has been deposited or formed on the print bed, or on the previously-formed layer of build material, the additive manufacturing apparatus may use control data defining where (e.g. to a pixel level) the printing agent is to be deposited on that particular layer of build material.

In some examples, the data defining an amount of printing agent to be deposited and the precise location at which printing agent is to be deposited may be modified or determined at blocks 104 or 204. Such data may be included in the build parameters. For example, based on an intended post-manufacturing treatment to be performed in respect of an object, it may be intended to increase or decrease an amount of detailing agent and/or coalescing agent a particular region (e.g. at or near to an external edge or surface of the object). Thus a build parameter may be determined that causes the amount of agent to be deposited at the particular region to be set accordingly. Thus, the build parameters may, in some examples, comprise parameters defining an amount of a particular printing agent to be deposited and a location at which the print agent is to be deposited.

Once an object has been manufactured in a manufacturing process, there are many different types of post-manufacturing operations or treatments (sometimes referred to as finishing processes, post-processing operations or post-production operations or treatments) that may be performed. In some examples, the post-manufacture treatment may comprise a treatment selected from a group comprising: mechanical polishing, chemical polishing and coloring. Mechanical polishing may include the use of techniques such as bead blasting (e.g. glass bead blasting) or sand blasting. Coloring may include the use of techniques to add or change the color of part or all of a surface of the object, and may include techniques such as painting, hydro painting, inking, spraying or dyeing. Build parameters may be determined to compensate for the effects of each different type of post-manufacture treatment that is to be applied. In addition to determining build parameters for each type of post-manufacture treatment, build parameters may be determined and/or modified according to particular details regarding each treatment. For example, build parameters may be determined according to a type of colorant used in a coloring treatment (e.g. paint, ink or dye), or according to a type of particles used in a mechanical polishing treatment. Various treatments such as those mentioned above are discussed below with reference to FIG. 3.

Figure 3:
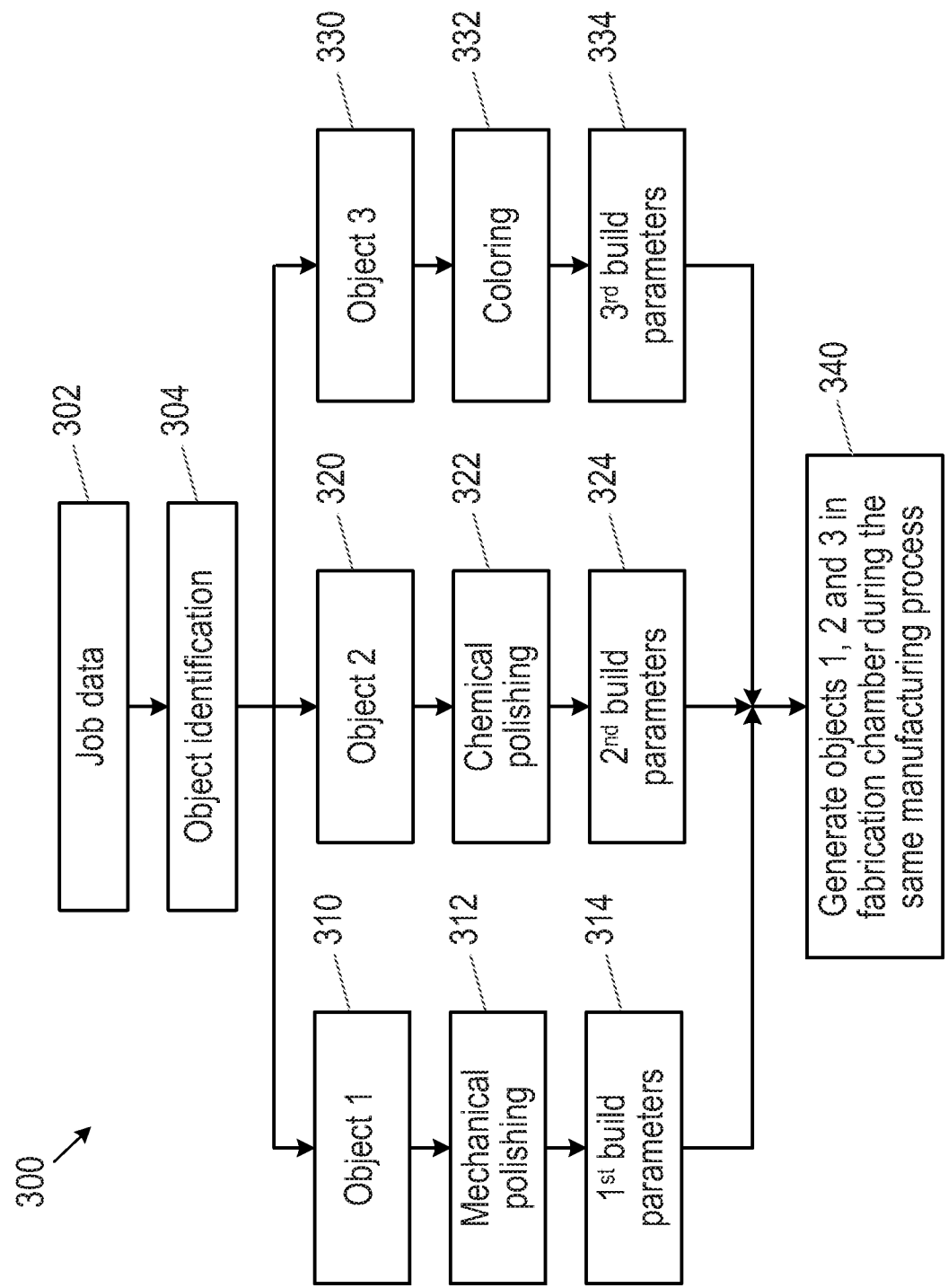
FIG. 3 is a flowchart of an example of a method of determining build parameters for three objects.

FIG. 3 is a flowchart of an example of a method 300 of determining build parameters for three objects. At block 302, job data is received which defines a plurality of objects that are to be manufactured during a manufacturing process. The job data may, for example, comprise data contained in a 3MF file. In some examples, such a 3MF file may include details of 3D geometries (e.g. models) defining the objects to be built, and an affine transformation matrix defining a position relative to the print bed where each object is to be produced. The 3MF file may be generated using software prior to the start of the manufacturing process, and sent to the manufacturing apparatus or to a processor performing the method 100, 200, for example using an 'HTTP POST' request. At block 304, each three-dimensional object to be manufactured is identified in the job data. For example, each object (or a part of an object where parts of an object are to be treated differently after manufacture) may be labelled with an identifier, such as an "Object/Part ID". Since the data contained in the 3MF file relates to each individual object to manufactured, it is possible to supplement that data with metadata for each object. Metadata defining the post-manufacturing treatment to be applied may be added, for example.

In the example shown in FIG. 3, three objects are to be manufactured in the manufacturing process: object 1 (at block 310), object 2 (at block 320) and object 3 (at block 330). In this example, a post-manufacture treatment to be applied to object 1 is mechanical polishing (block 312). Mechanical polishing involves placing the three-dimensional object (i.e. object 1 in this example) inside a tumbler containing particles or beads of a particular size and/or material. The type and size of the particles or beads depends on the intended surface finish to be achieved. A consequence of treating an object using mechanical polishing is that some features—particularly relatively small features—of an object may be worn away or eroded during the polishing process. Therefore, the build parameters in respect of object 1 may be determined to take account of the possible erosion or damage caused by the mechanical polishing. A first set of build parameters 314 may therefore be determined.

In order to compensate for the effects of mechanical polishing, features of an object that may be adversely affected by the mechanical polishing process may be formed larger during the manufacturing process to reduce the possibility that they will erode or be worn away entirely. In other words, small features of an object (e.g. object 1) may be locally dilated by determining build parameters for those features such that the relevant parts of the object are manufactured larger. The amount by which the size of part of the object is increased may be determined based on the type and size of particles used in the polishing process. The object size may be increased on a pixel-by-pixel basis, for example by depositing coalescing agent in pixel positions adjacent to the position where the agent is intended to be deposited to form the object. Thus, the first set of build parameters 314 may take account of the increased amount of coalescing or fusing agent that is to be used.

Thus, in some examples, the post-manufacture treatment may comprise mechanical polishing. In such examples, determining the build parameters may comprise determining parameters that cause regions of the three-dimensional object having a size falling below a defined threshold size to be generated at a larger size. The defined threshold size may be a size below which an object might be expected to break or entirely erode during a polishing process. When generated at a larger size, any wear or erosion experienced during polishing may cause the object size to decrease to its intended resulting size.

A post-manufacture treatment to be applied to object 2 is chemical polishing (block 322). Chemical polishing involves polishing the three-dimensional object using a chemical, or multiple chemicals. The chemicals may, however, interact with detailing agent, particularly when a large amount of detailing agent is used during a manufacturing process. Such interactions may cause areas of the surface of the object to appear light gray or white in color. Corners and edges of objects, where relatively large amounts of detailing agent are used may be affected by chemical polishing. Therefore, the build parameters in respect of object 2 may be determined to take account of the possible lightening of color in surface regions of the object as a result of the chemical polishing. A second set of build parameters 324 may therefore be determined.

In order to compensate for the effects of chemical polishing, the amount of detailing agent applied at regions corresponding to an edge, corner and/or surface region of an object may be reduced to reduce the severity of those parts appearing lighter in color. Thus, the second set of build parameters 324 may take account of the change in the amount of detailing agent that is to be used.

Thus, in some examples, the post-manufacture treatment may comprise chemical polishing. In such examples, determining the build parameters may comprise determining parameters that cause a relatively lower amount of detailing agent to be applied than would otherwise be applied to generate the three-dimensional object. For example, if a first amount of detailing agent is to be applied to a particular layer during manufacture of an object that is not to undergo chemical polishing, then a relatively smaller amount of detailing agent is to be applied to that particular layer for an object that is to undergo chemical polishing.

A post-manufacture treatment to be applied to object 3 is coloring (block 332). Some objects generated using manufacturing apparatuses, such as additive manufacturing apparatuses, may be formed of a build material having a dark color (e.g. gray or black). In some examples, printing agents used during the manufacturing process may affect the color of the object and may, in some examples, cause the object to be formed of a very dark color. In such examples, it can be difficult to effectively apply color (e.g. paint) to the object following its generation. Applying color may be more effective if the colorant is applied to an object of a lighter color. Therefore, the build parameters in respect of object 3 may be determined to take account of the resulting dark color of the object, which may affect the outcome of the coloring process (e.g. painting). A third set of build parameters 334 may therefore be determined.

In order to cause the object to have a lighter color, thermal bleeding (i.e. heat transfer) is enabled at regions near to the surface of the object, by reducing an amount of detailing agent used (thereby allowing heat to be transferred beyond the boundary of the object). In some examples, an amount of fusing agent applied near to the surface of the object may also be increased. As a result of the increased heat transfer, build powder to which fusing agent has not been applied will be caused to fuse, and this build powder will have a lighter color, resulting in an object having a lighter color, to which colorant can be applied in a more effected manner.

Thus, in some examples, the post-manufacture treatment may comprise coloring. In such examples, determining the build parameters may comprise determining parameters that cause a relatively larger amount of fusing agent to be applied than would otherwise be applied to generate the three-dimensional object. For example, if a first amount of fusing agent is to be applied to a particular layer at a surface region during manufacture of an object to which colorant is not to be applied, then a relatively larger amount of fusing agent is to be applied to that particular layer at the surface region for an object to which colorant is to be applied.

Once the first, second and third sets of build parameters 314, 324, 334 have been determined, they may be combined and used to generate objects 1, 2 and 3 using a manufacturing apparatus, during the same manufacturing process (block 340).

The examples described above with reference to FIG. 3 relate to additive manufacturing. As noted previously, examples described herein as also relevant to other manufacturing types. In selective laser sintering (SLS), for example, a parameter (e.g. a build parameter) relating to a laser energy to be used may be determined based on a post-manufacturing treatment to be applied. For example, if mechanical polishing or chemical polishing is intended to be performed after manufacture, then the laser energy to be applied at border regions of the object during manufacture may be increased. Setting the thermal energy parameter in this way may help to cause thermal bleeding (also referred to as blooming) to compensate for the intended post-manufacture polishing process. In fused deposition modelling (FDM), effects of post-processing polishing (e.g. chemical and mechanical polishing) may be compensated for by determining/setting a build parameter that caused additional material to be applied at border regions of the object.

Figure 4:
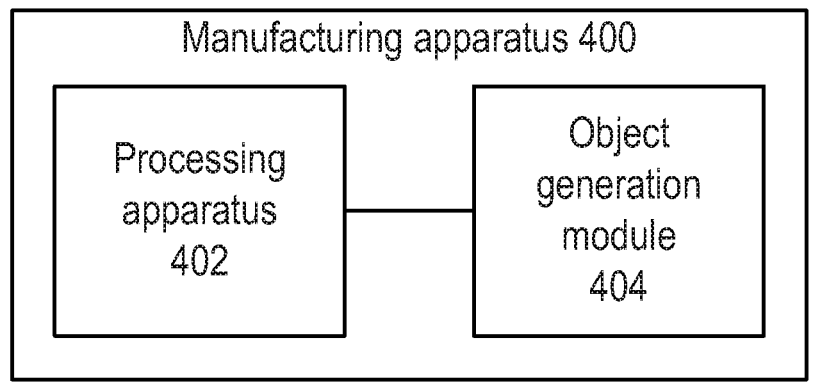
FIG. 4 is a schematic illustration of an example of an additive manufacturing apparatus according to the present disclosure.

As noted above, the methods 100, 200 discussed above may be performed using a processor, a processing apparatus or processing circuitry. Such processing equipment may form part of a computing device. In some examples, such processing equipment may form part of a manufacturing apparatus. FIG. 4 is a schematic illustration of a manufacturing apparatus 400. The manufacturing apparatus 400 may comprise an additive manufacturing apparatus, a selective laser sintering (SLS) apparatus, a fused deposition modelling (FDM) apparatus, or any other type of manufacturing apparatus used to generate three-dimensional objects.

The manufacturing apparatus 400 comprises a processing apparatus 402 and an object generation module 404. The processing apparatus 402 may be in operative communication with the object generation module 404. The processing apparatus 402 is to receive post-generation operation data defining a post-generation operation to be performed in respect of a three-dimensional object following completion of a manufacturing process to generate the three-dimensional object. The processing apparatus 402 is further to determine, based on the received post-generation operation data, a set of parameters to be applied in respect of the manufacturing process. The set of parameters may comprise the build parameters discussed above. In some examples, the set of parameters may comprise parameters relating to printing agents to be applied in respect of the manufacturing process.

The object generation module 404 is to generate the three-dimensional object based on the set of parameters. The object generation module 404 may, for example, comprise components of the manufacturing apparatus 400 which, under the control or instruction of the processing apparatus 402, manufacture the object or objects.

In some examples, prior to the processing apparatus 402 determining the set of parameters to be used by the object generation module 404, the processing apparatus may receive control data defining an initial set of parameters to be used by the object generation module 404 during generation of the three-dimensional object. In examples where the control data is received, the processing apparatus 402 may determine the set of parameters by modifying the initial set of parameters based on the received post-generation operation data. Thus, the initial set of parameters could be used to generate the object. However, with the additional data defining the post-generation operation to be performed, the initial set of parameters may be adjusted or modified so that the resulting generated object is more suited to the post-generation operation to be performed.

In other examples, for example where an initial set of parameters is not received, then the processing apparatus 402 may generate, based on the determined set of parameters, control data to be used by the object generation module 404 during generation of the three-dimensional object.

Figure 5:
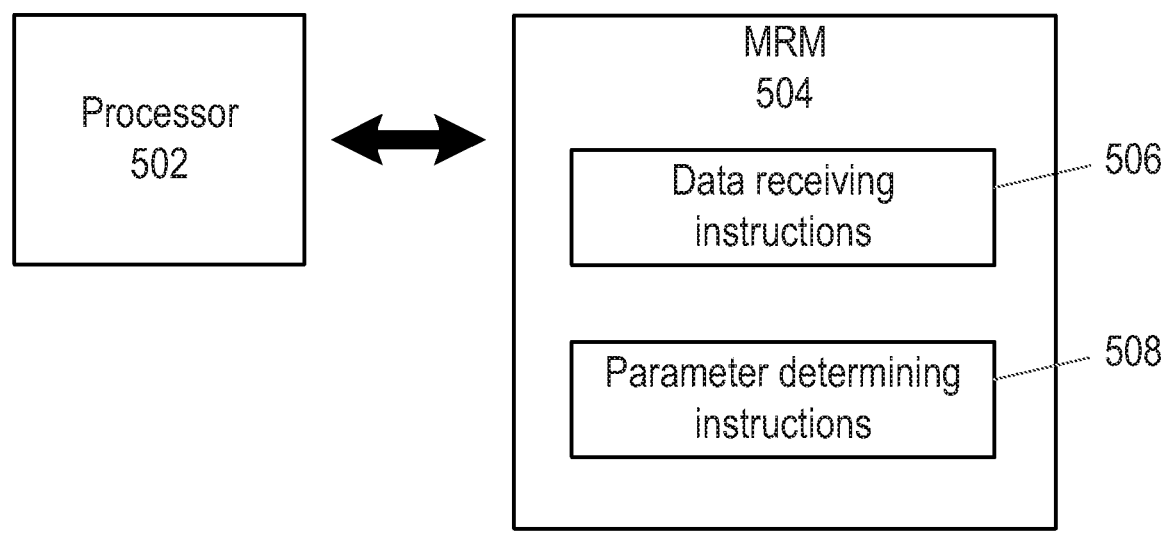
FIG. 5 is a schematic illustration of an example of a machine-readable medium in communication with a processor.

The present disclosure also relates to a machine-readable medium. FIG. 5 is a schematic illustration of an example of a processor 502 in communication with a machine-readable medium 504. The machine-readable medium 504 comprises instructions (e.g. data receiving instructions 506) which, when executed by the processor 502, cause the processor to receive data defining a finishing operation to be performed following completion of a manufacturing process to manufacture a three-dimensional object using a manufacturing apparatus. The finishing operation may comprise a post-generation treatment (e.g. polishing and/or coloring/painting) as discussed above. As noted above, the manufacturing apparatus may comprise an additive manufacturing apparatus, a selective laser sintering (SLS) apparatus, a fused deposition modelling (FDM) apparatus, or any other type of manufacturing apparatus used to generate three-dimensional objects.

The machine-readable medium 504 comprises further instructions (e.g. parameter determining instructions 506) which, when executed by the processor 502, cause the processor to determine, based on the data defining the finishing operation, parameters to be used by the manufacturing apparatus in respect of the manufacturing process.

In some examples, the machine-readable medium 504 may comprise further instructions which, when executed by the processor 502, cause the processor to operate components of a manufacturing apparatus to generate an object according to the determined parameters.

According the examples disclosed herein, a mechanism is provided by which the generation of three-dimensional objects can be improved or even optimized based on an indication of treatments to be performed in respect of the objects after they have been made. By tailoring parameters used by the manufacturing apparatus in this way, it is possible to create an object which is well suited for the treatment that is to be performed, resulting in a final product with fewer flaws or manufacturing defects. Each object being manufactured in the same manufacturing process can be treated individually, and build parameters for each object can be set or adjusted according to the post-build treatment to be performed.

Examples in the present disclosure can be provided as methods, systems or machine readable instructions, such as any combination of software, hardware, firmware or the like.

Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A computer-implemented method comprising:
    receiving data indicative of a post-manufacture treatment to be applied to a three-dimensional object following completion of a manufacturing process by a manufacturing apparatus to generate the three-dimensional object;
    determining, based on the received data indicative of the post-manufacture treatment, build parameters to be applied in respect of the manufacturing process; and
    causing the manufacturing apparatus to generate the three-dimensional object via the manufacturing process, based on the determined build parameters.

2. The computer-implemented method according to claim 1, further comprising, prior to determining the build parameters:
    receiving control data defining initial build parameters of the three-dimensional object to be generated in the manufacturing process,
    wherein determining the build parameters comprises modifying the initial build parameters of the received control data.

3. The computer-implemented method according to claim 1, further comprising:
    determining, based on the determined build parameters, control data for the manufacturing apparatus.

4. The computer-implemented method according to claim 1, wherein the manufacturing process comprises processing successive layers of build material to generate the three-dimensional object, and
    wherein determining the build parameters comprises determining parameters to be applied in respect of each layer of build material to be processed based on the indicated post-manufacture treatment.

5. The computer-implemented method according to claim 1, wherein the build parameters comprise parameters defining an amount of a particular printing agent to be deposited and a location at which the particular print agent is to be deposited.

6. The computer-implemented method according to claim 1, wherein the data indicative of a post-manufacture treatment is received from a user via a user interface.

7. The computer-implemented method according to claim 1, wherein the post-manufacture treatment comprises a treatment selected from a group comprising: mechanical polishing, chemical polishing and coloring.

8. The computer-implemented method according to claim 1, wherein the post-manufacture treatment comprises mechanical polishing, and determining the build parameters comprises determining parameters that cause regions of the three-dimensional object having a size falling below a defined threshold size to be generated at a larger size.

9. The computer-implemented method according to claim 1, wherein, the post-manufacture treatment comprises chemical polishing, and determining the build parameters comprises determining parameters that cause a relatively lower amount of detailing agent to be applied than would otherwise be applied to generate the three-dimensional object.

10. The computer-implemented method according to claim 1, wherein, when the post-manufacture treatment comprises coloring, and determining the build parameters comprises determining parameters that cause a relatively larger amount of fusing agent to be applied than would otherwise be applied to generate the three-dimensional object.

11. A system comprising:
a processing apparatus to:
receive post-generation operation data defining a post-generation operation to be performed in respect of a three-dimensional object following completion of a manufacturing process to generate the three-dimensional object; and
determine, based on the received post-generation operation data, a set of parameters to be applied in respect of the manufacturing process; and
a manufacturing apparatus to generate the three-dimensional object based on the set of parameters.

12. The system manufacturing apparatus according to claim 11, wherein, prior to determining the set of parameters, the processing apparatus is to:
receive control data defining an initial set of parameters to be used by the manufacturing apparatus during generation of the three-dimensional object,
wherein the processing apparatus is to determine the set of parameters by modifying the initial set of parameters based on the received post-generation operation data.

13. The system manufacturing apparatus according to claim 11, wherein the processing apparatus is to:
generate, based on the determined set of parameters, control data to be used by the manufacturing apparatus during generation of the three-dimensional object.

14. A non-transitory machine-readable medium storing instructions executable by a processor to:
receive data defining a finishing operation to be performed following completion of a manufacturing process to manufacture a three-dimensional object using a manufacturing apparatus;
determine, based on the data defining the finishing operation, parameters to be used by the manufacturing apparatus in respect of the manufacturing process; and
cause the manufacturing apparatus to generate the three-dimensional object based on the determined parameters.

* * * * *